United States Patent [19]

Guan

[11] Patent Number: 5,767,211
[45] Date of Patent: Jun. 16, 1998

[54] SYNTHESIS OF MULTI-FUNCTIONAL HYPERBRANCHED POLYMERS BY POLYMERIZATION OF DI-OR TRI-VINYL MONOMERS IN THE PRESENCE OF A CHAIN TRANSFER CATALYST

[75] Inventor: Zhibin Guan, Wilmington, Del.

[73] Assignee: E. I. du Pont de Nemours and Company, Wilmington, Del.

[21] Appl. No.: 850,028

[22] Filed: May 1, 1997

Related U.S. Application Data

[60] Provisional application No. 60/016,711 May 2, 1996.
[51] Int. Cl.[6] .................... C08F 4/80; C08F 4/04; C08F 20/56; C08F 20/18
[52] U.S. Cl. .............. 526/171; 526/172; 526/219.6; 526/303.1; 526/328
[58] Field of Search ............... 526/171, 172, 526/219.6, 303.1, 328

[56] References Cited

U.S. PATENT DOCUMENTS

| | | |
|---|---|---|
| 4,526,945 | 7/1985 | Carlson et al. ............ 526/145 |
| 4,547,323 | 10/1985 | Carlson ................. 260/465.4 |
| 4,608,423 | 8/1986 | Abbey .................... 526/172 |
| 4,680,352 | 7/1987 | Janowicz et al. ............ 526/147 |
| 4,694,054 | 9/1987 | Janowicz .................. 526/93 |

OTHER PUBLICATIONS

B. Yamada et al., *Polymer Bulletin*, 35(3), 245–250, 1995.

I. V. Golokov, et al., *Vysokomol. Soedin. Ser. B*, 27(4), 304–6, 1985 with English translation.

Primary Examiner—Joseph L. Schofer
Assistant Examiner—Wu C. Cheng

[57] ABSTRACT

This invention concerns the synthesis of multi-functional hyperbranched polymers by free radical polymerization of di- or tri-vinyl monomers in the presence of a chain transfer catalyst and a non-peroxide free radical initiator. The low viscosity and high functionality of these polymers make them useful for automotive coatings and for photopolymerization applications.

18 Claims, 4 Drawing Sheets

SYNTHESIS OF MULTI-FUNCTIONAL HYPERBRANCHED POLYMERS BY POLYMERIZATION OF DI-OR TRI-VINYL MONOMERS IN THE PRESENCE OF A CHAIN TRANSFER CATALYST

This application claims the priority benefit of U.S. Provisional Application 60/016,711, filed May 2, 1996.

FIELD OF THE INVENTION

This invention concerns the synthesis of multi-functional hyperbranched polymers by Free Radical Polymerization of di- or tri-vinyl monomers in the presence of a chain transfer catalyst. The hyperbranched polymers of this invention exhibit very low viscosity and high functionality. These properties make them useful for automotive coatings and for photopolymerization applications.

TECHNICAL BACKGROUND

Linear polyesters were reported to form by free radical polymerization of ethylene bis($\alpha$-ethylacrylate) (B. Yamada, K. Toda, and S. Aoki, *Polymer Bulletin* 1995, 35(3), 245) or triethylene glycol dimethacrylate (K. J. Abbey, U.S. Pat. No. 4,608,423) in the presence of a cobalt special chain transfer (SCT) catalyst. In the work of Yamada et al., the monomer used is free radically unpolymerizable and therefore a linear polymer was obtained. Abbey was using in situ generated SCT catalysts instead of a well defined chain transfer catalysts and the polymerization conditions were controlled so that only very low molecular weight oligomers, such as dimer, were formed.

Golokov et al. reported some kinetic studies on the polymerization of triethylene glycol dimethacrylate by using a cobalt complex of hematoporphyrin tetramethyl ester as the SCT catalyst (Golokov, I. V.; Semyannikov, V. A.; Mogilevich, M. M. *Vysokomol. Soedin. Ser. B* 1985, 27 (4), 304.) Soluble oligomers were obtained in some cases. The polymers were not characterized well and no structural information was available in the report.

SUMMARY OF THE INVENTION

The invention concerns the synthesis of hyperbranched homopolymers. These homopolymers are produced by the direct free radical polymerization of a di- or tri-vinyl monomer, such as a dimethacrylate monomer, in the presence of a special chain transfer (SCT) catalyst.

The invention also concerns highly branched copolymers which are synthesized by the copolymerization of divinyl monomers with monovinyl monomers in the presence of a SCT catalyst and an initiator.

DETAILED DESCRIPTION OF THE INVENTION

The polymerization mixture described herein contains at least the following:

one or more di-vinyl monomer (s);

one non-peroxide initiator; and one SCT catalyst.

In the above polymerization reaction, the non-peroxide initiator is preferably an azo initiator. Such polymerizations can be conducted in solution or in bulk. In the presence of the SCT catalyst, the free radical polymerization of divinyl monomers gives soluble, hyperbranched polymers, instead of insoluble networks which occur in the absence of such catalyst. The hyperbranched structures described herein have a ratio of internal vinylidene double bonds to external methacrylate double bonds which ranges from about 0.1 to 0.9, with the preferred range of 0.4 to 0.6. A structure for one of the hyperbranched polymers, poly(ethylene glycol dimethacrylate), i.e. (poly(EGDMA), is illustrated below and described in Scheme 3.

Scheme 1
Structure of the Hyperbranched Poly(EGDMA)

-continued
Scheme 1
Structure of the Hyperbranched Poly(EGDMA)

Such hyperbranched or highly branched polymers can be synthesized by homopolymerization of divinyl monomers or copolymerization of divinyl monomers with mono-vinyl monomers.

The divinyl monomers can be one of the following categories:

dimethacrylates or diacrylates, where the solid line represents any type of diol spacer bismethacrylamides or bisacrylamides, where the solid line represents any type of diamine spacer trimethacrylates or triacrylates, where the solid line represents any type of core structure The diol and diamine spacer groups are divalent organic groups which may be:

(1) linear or branched alkylene, i.e. —$C_nH_{2n}$—, wherein n is an integer from 1–30, for example methylene —$(CH_2)_n$—, wherein n is an integer from 1–30, or isopropylene —$(CH_2CH(CH_3))_m$—, where m is an integer from 1–15;

(2) alkoxylene, for example —$(CH_2)_o$—O]$_p$($CH_2)_o$—, where o is an integer from 2 to 6, p is an integer from 1–6; for example —$CH_2CH_2OCH_2CH_2$—; or, for example, —$(CHRCH_2O)_q$—$CHRCH_2$—, where q is an integer from 1 to 6 and R is $C_uH_{2u+1}$, where u is an integer form 1 to 4; for example, —$CH(CH_3)CH_2OCH(CH_3)CH_2$—; and aromatic analogs thereof, for example, —$CH_2CHOHCH_2O$—$C_6H_4$—$C(CH_3)_2$—$C_6H_4$—$OCH_2CHOHCH_2$—, —$CH_2CH_2O$—$C_6H_4$—$C(CH_3)_2$—$C_6H_4$—$OCH_2CH_2$—, and —$CH(CH_3)CH_2O$—$C_6H_4$—$C(CH_3)_2$—$C_6H_4$—$OCH_2CH(CH)_3$—; and (3) alkyl or aryl ester containing groups, for example —$(CH_2)_rOC(O)(CH_2)_sC(O)O(CH_2)_t$—, where r, s, and t are integers ranging from 1 to 6.

For the trimethacrylates and triacrylates, the "core" structure is a trivalent organic group, for example $CH(CH_2—)_3$ and $CH(CH_2CH_2—)_3$.

The mono-vinyl monomers for copolymerizations can be any kind of free radically polymerizable monomers.

The initiator can be any type of non-peroxide free radical initiator, preferably an azo initiator. Peroxy type initiators are to be avoided because they poison the cobalt catalysts and lead to gellation. A typical example of an azo initator is 2,2'-azobis(2,4-dimethylvaleronitrile) (VAZO-52) which has the structure shown below:

Other azo initiators include, but are not limited to, the following: 2,2-azobis-(4-methoxy-2,4-dimethylvaleronitrile), 2,2-azobis-(2,4-dimethylvaleronitrile), (1-phenylethyl)azodiphenylmethane, 2,2-azobis-(isobutyronitrile), dimethyl 2,2-azobis-(isobutyrate), 2,2-azobis-(2-methylbutyronitrile), 1,1-azobis-(1-cyclohexanecarbonitrile), 2,2-azobis-(2,4,4-trimethyl pentane), 2,2-azobis-2-methylpropane), 2,2-azobis (N,N-dimethylene isobutyronidine)dihydrochloride, 2,2-azobis-(2-amidnopropane)dihydrochloride, 2,2-azobis-(N,N-dimethyleneisobutyronidine), 4,4-azobis-(4-cyanopentanoic acid) and 3,3-azobis-(3cyanobutyrsulfonic acid).

The SCT catalysts can be any cobalt(II) or cobalt(III) complexes which give catalytic chain transfer reaction to free radical polymerization. Cobalt (II) catalysts that are useful herein are described in U.S. Pat. No. 4,608,423 and U.S. Pat. No. 4,680,352, which are incorporated herein by reference in their entirety. See, for example, column 5, lines 29–65 of U.S. Pat. No. 4,608,423. The structure of one typical SCT catalyst is shown below:

Scheme 2
Structure of COBF

Various studies have shown the usefulness of such cobalt complexes as catalysts. A series of cobalt complexes cause very efficient chain transfer reaction to free radical polymerization of vinyl monomers through β-H abstraction (a. Enikolopyan, N. S. et al, *J. Poly. Sci., Polym. Chem.* Ed. 1981, 19, 879; b. Parshall, G. W. and Ittel, S. D. *Homogeneous Catalysis*, 1992, 2nd ed., Wiley-Interscience; c. Davis, T. P. et al., *Trends in Polymer Science* 1995, 3(11), 365 and references therein). Gridnev, Ittel, Fryd and Wayland et al. have conducted systematic and thorough studies on the free radical polymerizations of vinyl monomers in the presence of a cobalt SCT catalyst (a. Gridnev, A. A.; Ittel, S. D.; Fryd, M. and Wayland, B. B. *Organometallics*, 1996, 15, 222; b. Gridnev, A. A.; Ittel, S. D.; Fryd, M. and Wayland, B. B. *J. Chem. Soc. Chem. Comm.* 1993, 1010; c. Gridnev, A. A.; Ittel, S. D.; Fryd, M. and Wayland, B. B. *Organometallics* 1993, 12, 4871). The catalytic chain transfer reaction has been used to synthesize very short oligomers, such as dimers and trimers of methacrylic acid derivatives (a. Janowicz, A. H., U.S. Pat. No. 4,694,054; b. Carlson, G. M., U.S. Pat. No. 4,547,323; c. Carlson, G. M. and Abbey, K. J., U.S. Pat. No. 4,526,945, all of which patents are incorporated herein by reference).

In this invention, a dimethacrylate such as ethylene glycol dimethacrylate (EGDMA) instead of a mono-methacrylate such as methyl methacrylate (MMA) was used as the monomer. The SCT catalyst concentration used herein is similar to that used for trimerization of MMA. The controlled propagation of EGDMA resulted in hyperbranched polymers instead of linear short oligomers (Scheme 3).

3rd generation nth generation

Typically, polymerizations were conducted in 50 wt/v % 1,2-dichloroethane solution or in bulk of 15 EGDMA monomer. Both gave soluble polymers as long as the COBF SCT catalyst concentration is adequate. Usually, 0.1–0.2 wt. % of the COBF and 1 wt. % of VAZO-52 (with respect to the monomer) was used for polymerizations at 55° C. for 24 hrs. The polymers obtained were usually viscous oil indicating very low $T_g$ for the polymers.

The polymers were analyzed by Gel Permeation Chromatography (GPC), $^1$H and $^{13}$C NMR, Matrix Assisted Laser Desorption Ionization (MALDI) Mass Spectrometry, etc. The molecular weight and polydispersity were measured by GPC. Since the polymers are hyperbranched, accurate molecular weight data cannot be obtained by simple calibration using linear polymer standards. Instead, both light scattering and viscometry detectors were used to get the accurate molecular weight data. The molecular weights range from a few thousands to more than 40,000 g/mol with typical polydispersity of 1.5–4.0.

Figure 1:
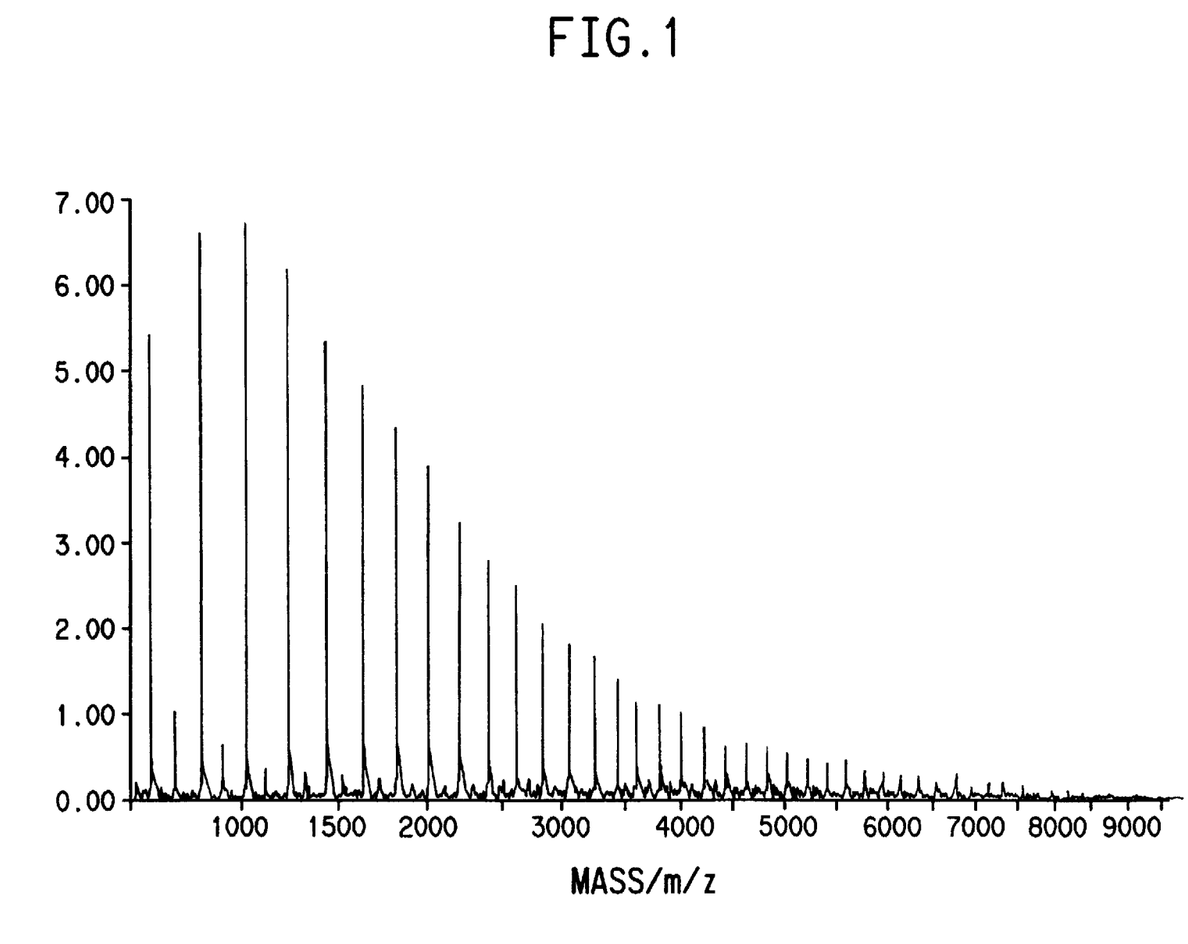
FIG. 1 shows the analysis of molecular weight by the MALDI mass spectrometry.

The molecular weight of the polymer was also analyzed by the MALDI mass spectrometry (FIG. 1). The MALDI spectrum shows clearly each individual oligomer of the polymer. The mass of each peak matches exactly the mass of that specific oligomer calculated based on the structure shown in Scheme 1. The MALDI spectrum also indicates that the polymer product is free of impurities.

Figure 2:
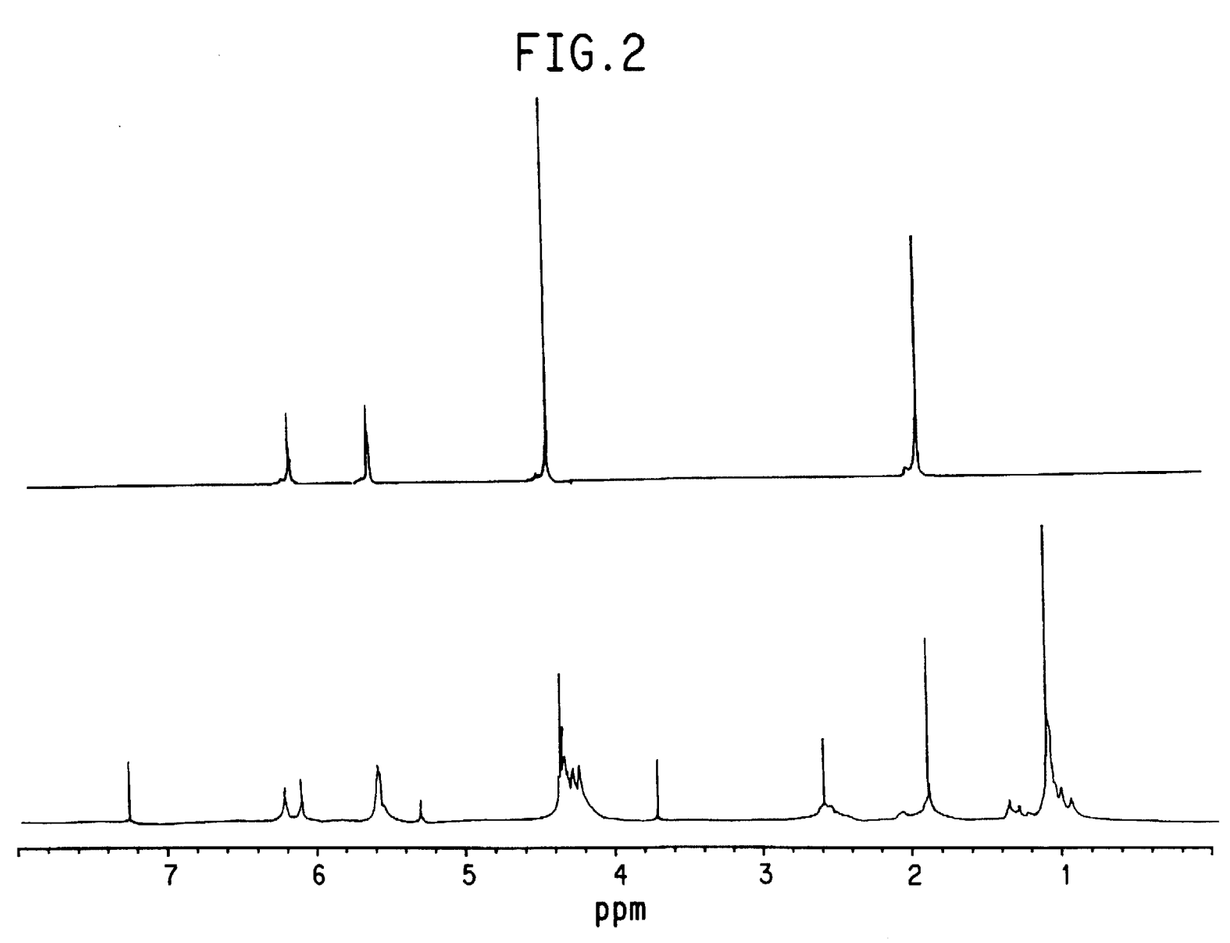
FIG. 2 compares $^1$H NMR spectra of both the ethylene glycol dimethacrylate (EGDMA) monomer and a poly (EGDMA).
Figure 3:
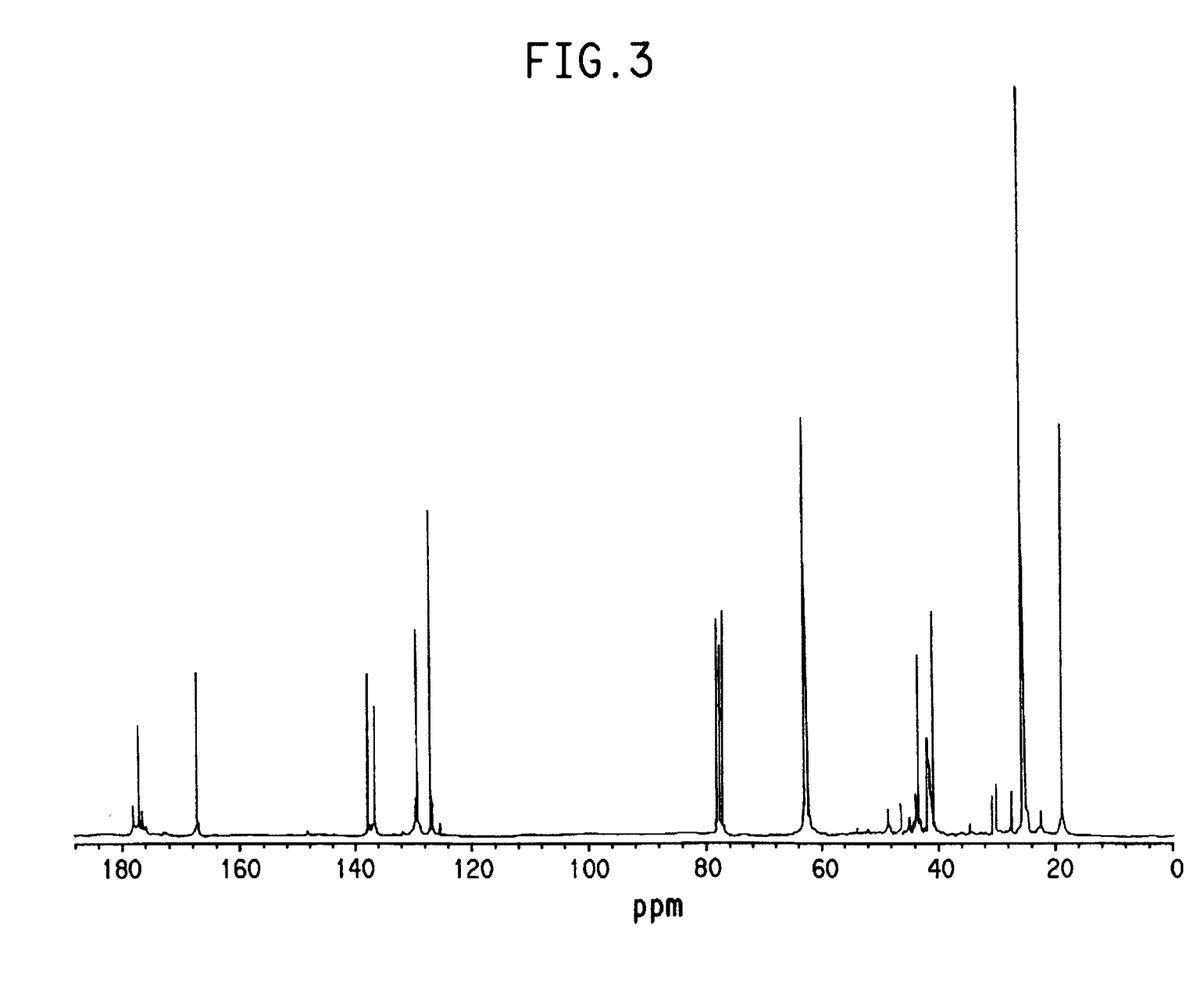
FIG. 3 gives the $^{13}$C NMR spectra for a hyperbranched poly(EGDMA).

Both $^1$H and $^{13}$C NMR spectra (FIGS. 2 and 3) agree well with the proposed hyperbranched structure as shown in Scheme 1. FIG. 2 compares the $^1$H NMR spectra of both the EGDMA monomer and a Poly(EGDMA). The assignments of the peaks are: 1.1 ppm (backbone —CH$_3$), 1.93 ppm (—CH$_3$ of the peripheral methacrylate group), 2.0–2.61 ppm (backbone —CH$_2$—), 4.15–4.40 ppm (—OCH$_2$CH$_2$O—), 5.50–5.60 ppm (overlap of vinyl H$_a$ of peripheral methacrylate and internal vinylidene groups), 6.10 ppm (vinyl H$_b$ of methacrylate), 6.22 ppm (vinyl H$_b$ of internal vinylidene). The relative ratios of the peaks agree well with those calculated from the structure shown in Scheme 1. The $^{13}$C NMR spectrum for a hyperbranched poly(EGDMA) is shown in FIG. 3. Assisted by DEPT and proton-carbon correlation experiments, the peaks are assigned as: 18.8 ppm (—CH$_3$ of methacrylate), 25.4 ppm (backbone —CH$_3$), 41.2 ppm (backbone —CH$_2$—), 43.5 ppm (backbone —CH$_2$—), 62.5–63.3 ppm (—OCH$_2$CH$_2$O—), 126.7 and 136.5 ppm (vinyl carbons of methacrylate), 129.1 and 137.6 ppm (vinyl carbons of internal vinylidene groups), 167.5 ppm (carbonyl of methacrylate), 175–178 ppm (carbonyl in backbone).

$^1$H and $^{13}$C NMR spectra provide strong evidence to support the hyperbranched structure of the polymers formed. Two sets of vinyl protons were observed on $^1$H NMR spectrum and two sets of vinyl carbons were observed on $^{13}$C NMR spectrum: one set belonging to the peripheral unreacted methacrylate groups and the other set due to the internal vinylidene groups resulted from the chain transfer reaction. $^{13}$C NMR also shows that there are two types of methylene groups in the polymer backbone which is again consistent with the hyperbranched structure. One peak at 41.2 ppm is due to the methylene between two quaternary carbons and the other one at 43.5 ppm is due to the methylene between one vinylidene group and a quaternary carbon. There are two sets of carbonyl peaks on $^{13}$C NMR spectrum, too. The one at 167.5 ppm is due to the peripheral methcarylate and the other one at 175–178 ppm is due to backbone ester groups. The multiplicity of both the ethylene glycol group ($^1$H NMR) and the backbone carbonyl group ($^{13}$C NMR) agree with the various chemical environments in the hyperbranched polymer structure.

Figure 4:
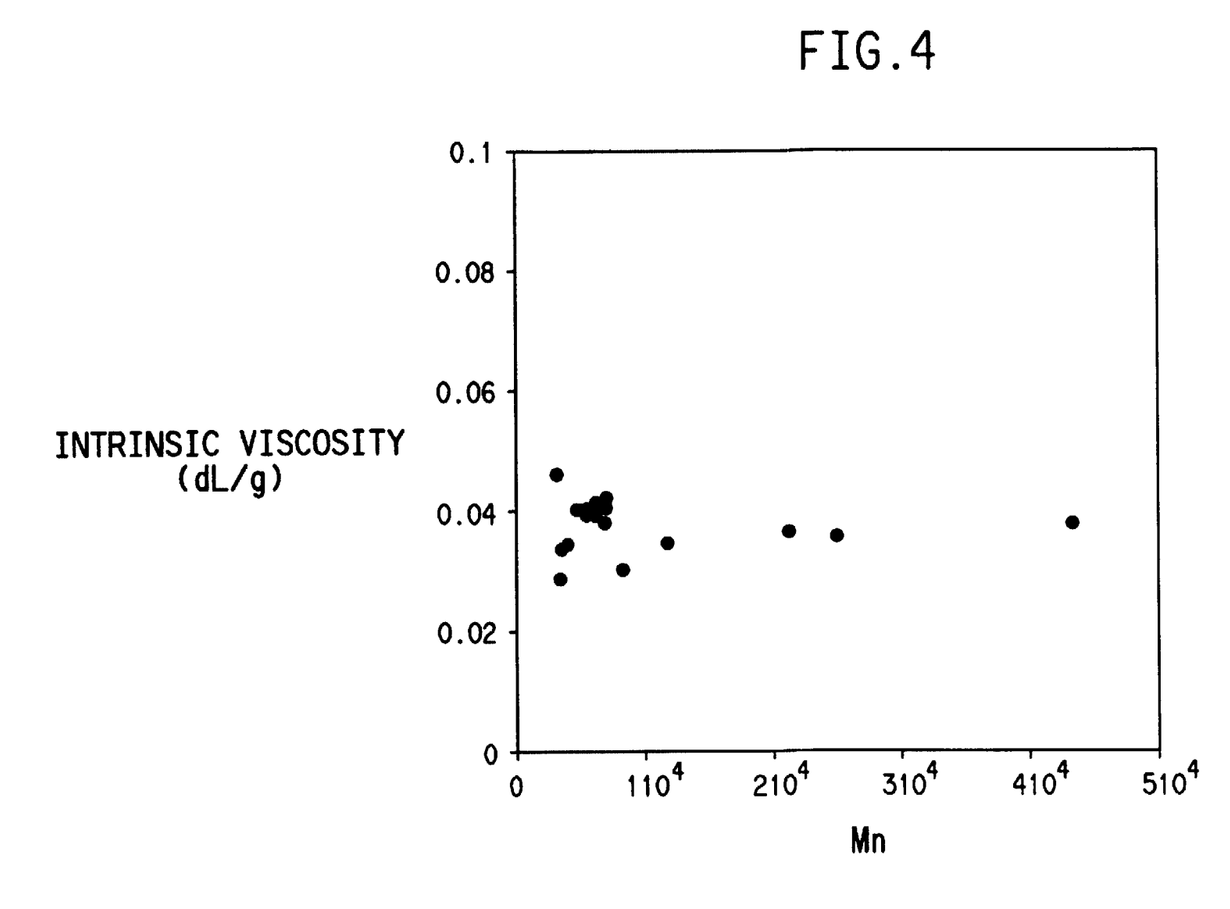
FIG. 4 shows a graph of Intrinsic Viscosity vs. Mn for poly(EGDMA).

The intrinsic viscosities of the hyperbranched poly-(EGDMA) are much lower compared to linear PMMA with the same molecular weight. For example, the [η] of a hyperbranched poly(EGDMA) with Mn of 29000 is only 0.036 dL/g, while for a linear PMMA with the same Mn, the [η] is 0.122 dL/g. Another interesting feature is that there is no dependence of intrisic viscosity on the molecular weight for the hyperbranched poly(EGDMA) (FIG. 4). This strongly suggests that the hyperbranched polymers assume spherical structures in solution.

EXAMPLES

Example 1
Homopolymerization of EGDMA 11.4 mg of COBF and 46.8 mg of VAZO-52 were added into a solution of 5.0 mL of EGDMA (de-inhibitored by passing through Al$_2$O$_3$ column) and 10.0 mL 1,2-dichloroethane. The solution was degassed by freeze-thawing three times. The polymerization was conducted at 52° C. for 15 hrs and then at 60° C. for 4 hrs. After finishing polymerization, the polymer was precipitated into a large excess of petroleum ether. Oily polymer was recovered and dried under vacuum overnight (63% yield). The polymer was analyzed by $^1$H NMR and GPC. $^1$H NMR is consistent with the structure. The $M_n$ of the polymer is 3300 (based on light scattering detector) with PDI of 1.4. The intrinsic viscosity is 0.046 dL/g.

Example 2
Homopolymerization of EGDMA 4.56 mg of COBF and 18.7 mg of VAZO-52 were added into a solution of 5.0 mL of EGDMA (de-inhibitored by passing through Al$_2$O$_3$ column) and 10.0 mL 1,2-dichloroethane. The solution was degassed by freeze-thawing three times. The polymerization was conducted at 52° C. for 17 hrs. After finishing polymerization, the solution was precipitated into a large excess of petroleum ether. Oily polymer was recovered and dried under vacuum overnight (40% yield). The polymer was analyzed by $^1$H NMR and GPC. $^1$H NMR is consistent with the structure. The $M_n$ of the polymer is 7000 (based on light scattering detector) with PDI of 1.6. The intrinsic viscosity is 0.041 dL/g.

Example 3
Homopolymerization of EGDMA 11.4 mg of COBF and 46.8 mg of VAZO-52 were added into 5.0 mL of EGDMA (de-inhibitored by passing through Al$_2$O$_3$ column). The solution was degassed by freeze-thawing three times. The polymerization was conducted in bulk at 55° C. for 3.5 hrs. After finishing polymerization, the polymerization solution was diluted with dichloromethane and then precipitated into a large excess of petroleum ether. Oily polymer was recovered and dried under vacuum overnight (40% yield). The polymer was analyzed by $^1$H NMR and GPC. $^1$H NMR is consistent with the structure. The $M_n$ of the polymer is 20600 (based on light scattering detector) with PDI of 2.9. The intrinsic viscosity is 0.037 dL/g.

Example 4
Homopolymerization of EGDMA 5.0 mg of COBF and 50.0 mg of VAZO-52 were added into a solution of 5.0 mL of EGDMA (de-inhibitored by passing through Al$_2$O$_3$ column) and 5.0 mL of 1,2-dichloroethane. The solution was degassed by freeze-thawing three times. The polymerization was conducted at 55° C. for 24 hrs. After finishing polymerization, the polymerization solution was diluted with dichloromethane and then precipitated into a large excess of petroleum ether. Oily polymer was recovered and dried under vacuum overnight (67% yield). The polymer was analyzed by $^1$H NMR and GPC. $^1$H NMR is consistent with the structure. The $M_n$ of the polymer is 9000 (based on light scattering detector) with PDI of 4.0. The intrinsic viscosity is 0.023 dL/g.

Example 5
Homopolymerization of EGDMA 10.0 mg of COBF and 50.0 mg of VAZO-52 were added into 5.0 mL of EGDMA (de-inhibitored by passing through $Al_2O_3$ column). The solution was degassed by freeze-thawing three times. The polymerization was conducted in bulk at 55° C. for 24 hrs. After finishing polymerization, the polymerization solution was diluted with dichloromethane and then precipitated into a large excess of petroleum ether. Oily polymer was recovered and dried under vacuum overnight (65% yield). The polymer was analyzed by $^1$H NMR and GPC. $^1$H NMR is consistent with the structure. The $M_n$ of the polymer is 21500 (based on light scattering detector) with PDI of 4.4. The intrinsic viscosity is 0.026 dL/g.

Example 6
Homopolymerization of EGDMA 200 mg of COBF and 1.0 g of VAZO-52 were added into a solution of 100 mL of EGDMA (de-inhibitored by passing through $Al_2O_3$ column) and 100 mL of 1,2-dichloroethane. The solution was degassed by freeze-thawing three times. The polymerization was conducted at 55° C. for 24 hrs. After finishing polymerization, the solution was diluted with dichloromethane and then precipitated into a large excess of petroleum ether. Oily polymer was recovered and dried under vacuum overnight (63% yield). The polymer was analyzed by $^1$H NMR and GPC. $^1$H NMR is consistent with the structure. The $M_n$ of the polymer is 5000 (based on light scattering detector) with PDI of 1.09. The intrinsic viscosity is 0.030 dL/g.

Example 7
Homopolymerization of Divinyl Benzene (DVB)

22.8 mg of COBF and 93.6 mg of VAZO-52 were added into a solution of 5.0 mL of DVB (de-inhibitored by passing through $Al_2O_3$ column) and 10.0 mL THF. The solution was degassed by freeze-thawing three times. The polymerization was conducted at 52° C. for 65 hrs. After finishing polymerization, the solution was precipitated into a large excess of petroleum ether. Oily polymer was recovered and dried under vacuum overnight (35% yield). The polymer was analyzed by $^1$H NMR and GPC. $^1$H NMR is consistent with the structure. The $M_n$ of the polymer is 81000 (based on light scattering detector) with PDI of 1.9. The intrinsic viscosity is 0.034 dL/g.

Example 8
Homopolymerization of Trimethylpropane Trimethacrylate (TMPTMA)

20.0 mg of COBF and 50.0 mg of VAZO-52 were added into a solution of 5.0 mL of TMPTMA (de-inhibitored by passing through $Al_2O_3$ column) and 5.0 mL 1,2-dichloroethane. The solution was degassed by freeze-thawing three times. The polymerization was conducted at 55° C. for 24 hrs. After finishing polymerization, the solution was precipitated into a large excess of petroleum ether. Oily polymer was recovered and dried under vacuum overnight. The polymer was analyzed by $^1$H NMR and GPC. $^1$H NMR is consistent with the structure. The $M_n$ of the polymer is 14500 (based on light scattering detector) with PDI of 2.2. The intrinsic viscosity is 0.023 dL/g.

Example 9
Comopolymerization of EGDMA with 2-Hydroxyethyl Methacrylate (HEMA)

2.5 mg of COBF and 50.0 mg of VAZO-52 were added into a solution of 4.5 mL of EGDMA, 0.50 mL of HEMA (both monomers were de-inhibitored by passing through $Al_2O_3$ column) and 5.0 mL of 1,2-dichloroethane. The solution was degassed by freeze-thawing three times. The polymerization was conducted at 55° C. for 20 hrs. After finishing polymerization, the solution was precipitated into a large excess of petroleum ether. Oily polymer was recovered and dried under vacuum overnight (74% yield). The polymer was analyzed by $^1$H NMR and GPC. $^1$H NMR is consistent with the structure. The molar ratio of HEMA/EGDMA in the copolymer is 0.20 as calculated from the $^1$H NMR spectrum. The $M_n$ of the polymer is 950 (based on universal calibration) with PDI of 3.2. The intrinsic viscosity is 0.052 dL/g.

Example 10
Comopolymerization of EGDMA with 2-Hydroxyethyl Acrylate (HEA)

20 mg of COBF and 50.0 mg of VAZO-88 were added into a solution of 4.0 mL of EGDMA, 1.0 mL of HEA (both monomers were de-inhibitored by passing through $Al_2O_3$ column) and 5.0 mL of 1,2-dichloroethane. The solution was degassed by freeze-thawing three times. The polymerization was conducted at 90° C. for 24.5 hrs. After finishing polymerization, the solution was precipitated into a large excess of petroleum ether. Oily polymer was recovered and dried under vacuum overnight (69% yield). The polymer was analyzed by $^1$H NMR and GPC. The $M_n$ of the polymer is 2460 (based on universal calibration) with PDI of 5.1. The intrinsic viscosity is 0.039 dL/g.

Example 11
Comopolymerization of EGDMA with Glycidyl Acrylate (GA)

10 mg of COBF and 50.0 mg of VAZO-52 were added into a solution of 3.0 mL of EGDMA, 2.0 mL of GA (both monomers were de-inhibitored by passing through $Al_2O_3$ column) and 5.0 mL of 1,2-dichloroethane. The solution was degassed by freeze-thawing three times. The polymerization was conducted at 55° C. for 25.5 hrs. After finishing polymerization, the solution was precipitated into a large excess of petroleum ether. Oily polymer was recovered and dried under vacuum overnight (79% yield). The polymer was analyzed by $^1$H NMR and GPC. $^1$H NMR is consistent with the structure. The $M_n$ of the polymer is 5400 (based on universal calibration) with PDI of 1.99. The intrinsic viscosity is 0.043 dL/g.

Example 12
Comopolymerization of EGDMA with Methacrylic Acid (MA)

2.5 mg of COBF and 50.0 mg of VAZO-52 were added into a solution of 3.0 mL of EGDMA, 2.0 mL of MA (both monomers were de-inhibitored by passing through $Al_2O_3$ column) and 5.0 mL of THF. The solution was degassed by freeze-thawing three times. The polymerization was conducted at 55° C. for 24.83 hrs. After finishing polymerization, the solution was precipitated into a large excess of petroleum ether. Oily polymer was recovered and dried under vacuum overnight (41% yield). The polymer was analyzed by $^1$H NMR and GPC. $^1$H NMR is consistent with the structure. The $M_n$ of the polymer is 3050 (based on universal calibration) with PDI of 1.4.

Example 13
Homopolymerization of 1,4-Butane Diol Dimethacrylate (BDDMA)

2.5 mg of COBF and 50.0 mg of VAZO-52 were added into a solution of 5.0 mL of BDDMA (de-inhibitored by passing through $Al_2O_3$ column) and 5.0 mL 1,2-dichloroethane. The solution was degassed by freeze-thawing three times. The polymerization was conducted at 55° C. for 24 hrs. After finishing polymerization, the solution was precipitated into a large excess of petroleum ether. Oily polymer was recovered and dried under vacuum overnight (45% yield). The polymer was analyzed by $^1H$ NMR and GPC. $^1H$ NMR is consistent with the structure. The $M_n$ of the polymer is 5440 (based on light scattering detector) with PDI of 1.8.

Example 14
Homopolymerization of 1,6-Hexane Diol Dimethacrylate (HDDMA)

2.5 mg of COBF and 50.0 mg of VAZO-52 were added into a 5.0 mL of HDDMA (de-inhibitored by passing through $Al_2O_3$ column). The solution was degassed by freeze-thawing three times. The polymerization was conducted at 55° C. for 5.5 hrs. After finishing polymerization, the solution was precipitated into a large excess of petroleum ether. Oily polymer was recovered and dried under vacuum overnight (16% yield). The polymer was analyzed by $^1H$ NMR and GPC. $^1H$ NMR is consistent with the structure. The $M_n$ of the polymer is 7000 (based on light scattering detector) with PDI of 1.9.

Example 15
Homopolymerization of 1,10-Decane Diol Dimethacrylate (DDDMA)

1.25 mg of COBF and 50.0 mg of VAZO-52 were added into a solution of 5.0 mL of DDDMA (de-inhibitored by passing through $Al_2O_3$ column) and 5.0 mL 1,2-dichloroethane. The solution was degassed by freeze-thawing three times. The polymerization was conducted at 55° C. for 8.75 hrs. After finishing polymerization, the solution was precipitated into a large excess of petroleum ether. Oily polymer was recovered and dried under vacuum overnight (30% yield). The polymer was analyzed by $^1H$ NMR and GPC. $^1H$ NMR is consistent with the structure. The $M_n$ of the polymer is 4800 (based on light scattering detector) with PDI of 1.9.

Example 16
Homopolymerization of Diethyleneglycol Dimethacrylate (DEGDMA)

1.25 mg of COBF and 50.0 mg of VAZO-52 were added into a solution of 5.0 mL of DEGDMA (de-inhibitored by passing through $Al_2O_3$ column) and 5.0 mL 1,2-dichloroethane. The solution was degassed by freeze-thawing three times. The polymerization was conducted at 55° C. for 8.75 hrs. After finishing polymerization, the solution was precipitated into a large excess of petroleum ether. Oily polymer was recovered and dried under vacuum overnight (53% yield). The polymer was analyzed by $^1H$ NMR and GPC. $^1H$ NMR is consistent with the structure. The $M_n$ of the polymer is 3070 (based on light scattering detector) with PDI of 20.3.

What is claimed is:

1. A homopolymerization process for preparing non-crosslinked hyperbranched homopolymers comprising:
    (a) providing a divinyl or trivinyl monomer;
    (b) homopolymerizing said divinyl or trivinyl monomer in the presence of a chain transfer catalyst and a non-peroxide free radical initiator.

2. The process of claim 1 wherein the divinyl or trivinyl monomer is selected from the group consisting of: dimethacrylates, diacrylates, bismethacrylamides, bisacrylamides, di(isopropenyl)benzene, divinyl benzene, trimethacrylates and triacrylates, wherein said dimethacrylates and diacrylates contain a diol spacer and said bismethacrylamides and bisacrylamides contain a diamine spacer and said trimethacrylates and triacrylates contain a core structure.

3. The process of claim 1 wherein the non-peroxide initator is an azo initiator.

4. The process of claim 3 wherein the azo initiator is selected from the group consisting of: 2,2-azobis-(4-methoxy-2,4-dimethylvaleronitrile), 2,2-azobis-(2,4-dimethylvaleronitrile), (1-phenylethyl)azodiphenylmethane, 2,2-azobis-(isobutyronitrile), dimethyl2,2-azobis-(isobutyrate), 2,2-azobis-(2-methylbutyronitrile), 1,1-azobis-(1-cyclohexanecarbonitrile), 2,2-azobis-(2,4,4-trimethyl pentane), 2,2-azobis-2-methylpropane), 2,2-azobis (N,N-dimethylene isobutyronidine)dihydrochloride, 2,2-azobis-(2-aminopropane)dihydrochloride, 2,2-azobis-(N,N-dimethyleneisobutyronidine), 4,4-azobis-(4-cyanopentanoic acid) and 3,3-azobis-(3cyanobutyrsulfonic acid).

5. The process of claim 1 wherein the chain transfer catalyst is a cobalt(II) or cobalt(III) complex.

6. The product of the process of claim 1.

7. The product described by claim 6 wherein the hyperbranched homopolymers have a ratio of internal vinylidene double bonds to external methacrylate double bonds of about 0.1 to 0.9.

8. The product of claim 7 wherein the ratio of internal vinylidene bonds to external methacrylate double bonds is 0.4 to 0.6.

9. A copolymerization process for the preparation of hyperbranched or highly branched copolymers comprising:
    (a) providing one or more divinyl monomer(s) and mono-vinyl monomers;
    (b) copolymerizing said divinyl monomers with said monovinyl monomers in the presence of a non-peroxide free radical initiator and a chain transfer catalyst.

10. The copolymerization process of claim 9 wherein the mono-vinyl monomer contains functional groups selected from the group consisting of hydroxyl, carboxylic acid, amino and epoxy.

11. The copolymerization process of claim 9 wherein the mono-vinyl monomer is selected from the group consisting of (meth)arcylic acid, 2-hydroxyethyl(meth)acrylate and glycidy(meth)acrylate.

12. The copolymerization process of claim 9 wherein the initiator is an azo initiator.

13. The process of claim 12 wherein the initiator is selected from the group consisting of 2,2-azobis-(4-methoxy-2,4-dimethylvaleronitrile), 2,2-azobis-(2,4-dimethylvaleronitrile), (1-phenylethyl)azodiphenylmethane, 2,2-azobis-(isobutyronitrile), dimethyl 2,2-azobis-(isobutyrate), 2,2-azobis-(2-methylbutyronitrile), 1,1-azobis-(1-cyclohexanecarbonitrile), 2,2-azobis-(2,4,4-trimethyl pentane), 2,2-azobis-2-methylpropane), 2,2-azobis (N,N-dimethylene isobutyronidine)dihydrochloride, 2,2-azobis-(2-aminopropane)dihydrochloride, 2,2-azobis-(N,N-dimethyleneisobutyronidine), 4,4-azobis-(4-cyanopentanoic acid) and 3,3-azobis-(3cyanobutyrosulfonic acid).

14. The process of claim 10 wherein the chain tranfer catalyst is a cobalt(II) or cobalt(III) complex.

15. The product of the process of claim 9.

16. The product of the process of claim 9 which is a highly branched polymer.

17. The process of claim 2 wherein the diol and diamine spacer groups are divalent organic groups selected from the group consisting of:

(1) linear or branched alkylene of the structure —$C_nH_{2n}$—, wherein n is an integer from 1–30;

(2) alkoxylene of the structures: —$(CH_2)_o$—$O]_p(CH_2)_o$—, where o is an integer from 2 to 6, p is an integer from 1–6; or an alkoxylene of the structure: —$(CHRCH_2O)_q$—$CHRCH_2$—, where q is an integer from 1 to 6 and R is $C_uH_{2u+1}$, where u is an integer from 1 to 4; and aromatic analogs thereof; and (3) alkyl or aryl ester.

18. The process of claim 2 wherein the "core" structure for the trimethacrylates and triacrylates is a trivalent organic group.

* * * * *